United States Patent Office
3,679,661
Patented July 25, 1972

3,679,661
PREPARATION OF WATER-SOLUBLE, DYED SUBSTRATES FOR AMYLASE ASSAY
Arthur L. Babson, Morristown, N.J., assignor to Warner-Lambert Company, Morris Plaines, N.J.
No Drawing. Continuation-in-part of application Ser. No. 771,354, Oct. 28, 1968, now Patent No. 3,597,322, dated Aug. 3, 1971, which is a continuation-in-part of abandoned application Ser. No. 521,814, Jan. 20, 1966. This application Dec. 21, 1970, Ser. No. 100,373
Int. Cl. C08b 19/00, 19/12
U.S. Cl. 260—233.3 R
14 Claims

ABSTRACT OF THE DISCLOSURE

Water-soluble, dyed substrates for use in assaying amylase activity in such media as body fluids, plant extracts, and the like, are prepared by coupling, in an aqueous alkaline solution, a reactive dye with a starch or starch fraction, such as amylose or amylopectin and removing all unreacted dye from the water-soluble substrate obtained. Gel filtration or dialysis can be used as the purification process, provided the process is monitored to detect the presence of free dye in the purified solution of dyed substrate. To monitor the purification procedure, an alcoholic tannic acid precipitating agent is used to precipitate the dyed substrate from a sample of the solution being purified and the supernatant fluid is observed for the presence of color; color in the supernatant fluid indicates that some free dye remains, and that the dyed substrate solution requires further purification. The preferred precipitating agent contains a 0.5% to 2% tannic acid in 50% alcohol, buffered to a pH of 5.0 to 5.5 and brought to a temperature of from about 20° C. to about 30° C.

CROSS REFERENCE TO RELATED APPLICATION

This application is a continuation-in-part of my pending U.S. Pat. application No. 771,354, filed Oct. 28, 1968, now U.S. Pat. No. 3,597,322, issued Aug. 3, 1971 which in turn, is a continuation-in-part of U.S. Pat. application Ser. No. 521,814, filed Jan. 20, 1966, now abandoned.

BACKGROUND OF THE INVENTION

Starch, a polysaccharide, whose empirical formula is $(C_6H_{10}O_5)n$ is a polymeric material comprising essentially an amylose fraction of the formula:

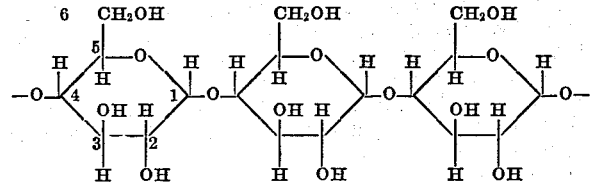

and an amylopectin fraction of the formula:

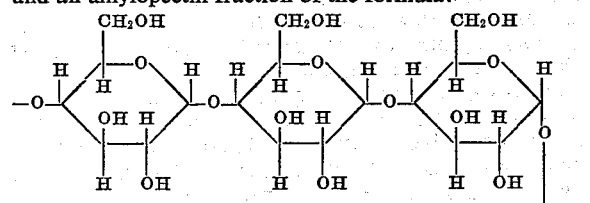

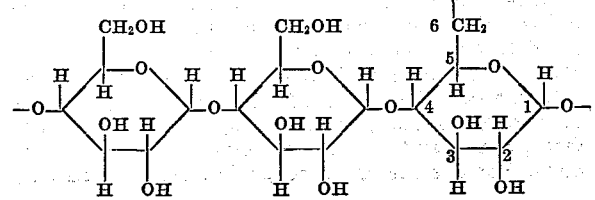

The amylases are enzymes which catalyze the hydrolysis of starch. The amylases are of two types, α-amylase which can hydrolyze both the α-1,4 and α-1,6 linkages of amylose and amylopectin, respectively, and can therefore hydrolyze starch completely and β-amylase which can hydrolyze only the α-1,4 linkage of the amylose thus leaving the α-1,6 linkage of amylopectin unchanged. The action of α-amylase is to hydrolyze both the amylose and amylopectin randomly which produces progressively smaller polysaccharide fragments until nothing remains but maltose and perhaps some glucose. α-Amylase is activated by chloride ions and has optimum activity at a pH of about 7.

The amylases of animal origin are of the α-amylase type. Their presence has been demonstrated in many tissues, but they are primarily produced by the pancreas and salivary glands. The function of the amylase present in the secretions of these glandular tissues is to aid in the digestion of starch by hydrolyzing or splitting the starch into smaller molecules which can then be absorbed and assimilated.

While for over 100 years amylase has been known to be present in the blood stream, the exact body source of this enzyme in normal serum has not been established. The source is apparently not in the pancreas and salivary glands as removal of these glands has a negligible effect on normal serum amylase levels. Serum amylase levels have been observed to be elevated in a number of pathological conditions, but the most spectacular rise in serum amylase levels occurs in acute pancreatitis where sudden increases to 30 or 40 times the normal level are not uncommon. In chronic pancreatitis the increases are more moderate and a substantial number of patients may actually have normal levels. The mechanism underlying this rise in serum amylase levels in these conditions appears to be obstruction of the outflow of secretion coupled with disruption of the acinar cells. The moderate elevations in serum amylase seen in perforated peptic ulcer and intestinal obstruction are probably caused by leakage of the enzyme from the intestinal tract into the peritoneal cavity and reabsorption from this cavity into the general circulation. Moderate elevations are also seen in mumps, renal insufficiency and cancer of the pancreas. Hepatobiliary disease is characterized by low levels of serum amylase.

The amylase activity of serum samples can be measured by observing the extent of the loss of certain properties of starch which amylase can effect as the starch is hydrolyzed (amyloclastic methods) or by the generation of reducing substances (saccharogenic methods). The amyloclastic methods have utilized the measurement of the decrease in viscosity (viscosimetric) or turbidity (turbidimetric) as the starch suspension is liquefied by the enzyme. More often the observed decrease in the blue color obtained by the reaction of the starch with iodine after an arbitrary incubation period is utilized as the measure of amyloclastic activity.

Many modifications of the basic iodometric procedure for the amyloclastic method introduced in 1908 by Wohlgemuth have appeared over the years. In some, the incubation time is fixed and the decrease in color is measured photometrically while in others the incubation is continued until the blue color is no longer obtained. The constant incubation technique has the disadvantage that the optical density obtained does not bear a linear relationship to the amount of enzymatic hydrolysis. The reason for this is that the starch-iodine color reaction goes through a series of color changes from blue to violet to amber to red to colorless as the size of the starch molecule diminishes. The variable incubation technique requires the removal of several aliquots of the enzyme sample-starch incubation mixture at various times for testing with iodine. This is quite cumbersome when several samples must be tested. All of the amyloclastic methods must use suboptimum substrate concentrations since destruction of the substrate rather than formation of reaction products is the measure of enzyme activity. Amyloclastic activity can vary considerably depending upon the source of the starch. Serum proteins can interfere markedly with the starch-iodine color reaction to give erroneous enzyme measurements (Clin. Chem. Acta 8: 918, 1963). Furthermore, as has been observed in Clin. Chem. Acta 9: 515, 1964, merely heating the saline-diluted, serum sample under study abolishes the apparent saccharogenic activity and elevates the apparent amyloclastic activity of the sample.

The original saccharogenic method of Somogyi (J. Biol. Chem. 25: 399) introduced in 1938 is still widely used, although it has subsequently been improved by Somogyi and by Henry and Chiamori. The latter method has been recommended. In this procedure, 1 ml. of serum or other suitable sample containing an unknown concentration of amylase is incubated at 40° C. for 30 minutes with 7 ml. of buffered substrate containing 75 mg. of starch. The reaction is terminated with tungstic acid, and reducing sugars are determined on the resulting filtrate. The amylase unit of actvity, which is also known as the Somogyi unit, is defined as the amount of reducing substances in the incubated sample over a nonincubated control equivalent to 1 mg. of glucose. The normal range of amylase in blood is about 40–140 units/100 ml.

Even though these modified procedures for the saccharogenic method are much more accurate than the previously described amyloclastic methods, the saccharogenic method is basically very time consuming, complex, and requires that a large and variable blank of preformed reducing sugar be determined. Unhydrolyzed starch often creates turbidity and interferes with the determination of reducing sugars.

From the foregoing discussion, it is apparent that there is a genuine and serious need for a simple, rapid, and accurate method for assaying amylase activity requiring a relatively small amount of sample.

SUMMARY OF THE INVENTION

Water-soluble, dyed substrates from which all unreacted dye has been removed by means of a monitored purification process, are obtained by coupling a reactive dye to a starch or a starch fraction in an alkaline solution, neutralizing the reaction mixture and removing all unreacted dye by a monitored gel filtration procedure or by dialysis treatment. For monitoring the purification, an alcoholic tannic acid precipitating agent is used to precipitate out the water-soluble, dyed substrate from successive fractions of the purified solution, and the supernatant fluid remaining after precipitation is observed for the presence of color. Suitably, the alcoholic tannic acid precipitating agent contains from about 0.5% to about 2% tannic acid in about 50% alcohol, buffered to a pH of 5.0 to 5.5, and brought to a temperature of 20° C. to 30° C.

DESCRIPTION OF THE INVENTION

The water-soluble dyed substrates completely free of unreacted dye, which are obtained by the process of the present invention are suitable for use in an improved amylase assay procedure. The assay combines the technical superiority of the prior art saccharogenic procedures with the speed and simplicity of the prior art amyloclastic method.

The reactive dyes useful in the practice of this invention are widely known in the cellulosic textile dyeing art, and as brought out in that art, can be of various dyestuff classes, for example, azo, complex meta-azo, anthraquinone, phthalocyanine, dioxazine or formazyl dyestuff, which, in particular, can also contain a sulfo group.

These dyes are sold, for example by Ciba Co., Inc. under their trade name "Cibacron," by Imperial Chemical Industries Limited under their trade name "Procion," by Farbwerke Hoechst A.G. under their trade name "Remazol," by Sandoz under their trade name "Drimarene," and by Geigy under their trade name "Reactone."

In general these reactive dyes have the following structural formulas:

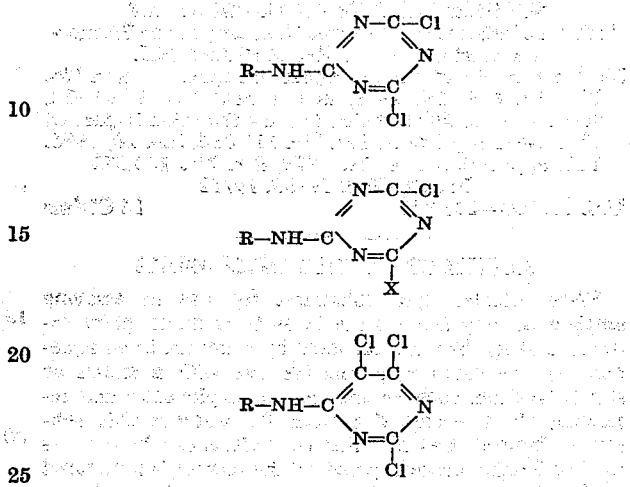

wherein R is a chromophor derived from the various classes of dyestuffs such as the azo, anthraquinone, formazyl or phthalocyanine structures mentioned and X is halogen or can be an inactive radical which may contain a solubilizing group. Examples of such reactive dyes are those that are described, for example, in U.S. Pat. Nos. 2,820,785; 2,889,316; 2,891,941; 2,892,828; 2,979,498; 3,054,795; 3,036,058; 3,149,100; 3,127,232 and the like.

The reactive groups of these dyestuffs contain at least one substituent which, under fixing conditions, splits off as an anion. The reactive group can consist, for example, of the radical of a cyclic carbimide halide which contains at least one mobile halogen atom bound to a carbon atom in the ring which is adjacent to a tertiary ring nitrogen atom. The reactive group can consist, in particular, of an azine ring of aromatic character which contains at least two tertiary ring nitrogen atoms and at least one mobile halogen atom bound to ring carbon adjacent to such nitrogen atoms such as, e.g. chlorine or bromine; examples of such reactive groups are mono-, di- or trihalogen diazinyl or mono- or di-halogen triazinyl groups.

The starch which is suitable for use in the practice of this invention can be obtained from potato, tapioca, corn, wheat, rice, sweet potato, waxy maize, or any other source which may be dyed in accordance with the process of this invention to yield the desired soluble dyed substrate. Solubility characteristics of the starch starting material may vary over a wide range but the dyed final product must be water-soluble for use on the assay of this invention. Amylose and amylopectin are commercially available as carefully standardized fractions, obtained from starch in the following manner: dilute starch pastes containing 2–3% of starch are autoclaved. The hot starch solution is saturated with an alcohol such as butanol or pentanol, in order to precipitate out essentially amylose, the straight chain fraction of starch, which gives an intense blue color with iodine. The main body of the starch present, not separated by this butanol treatment, is the amylopectin or branched chain fraction of starch which gives a red color with iodine. In the preferred embodiment of this invention, amylopectin is the fraction used.

While it is not necessary that the starch starting material be soluble in water to any great extent, it has been found that it is critical that the dyed substrate product obtained for use in the improved assay procedure be soluble in water. The use of a dyed, water-soluble substrate provides a technically superior assay which is simple and fast, yet sufficiently sensitive to insure accuracy and reliability. For this reason, although insoluble or relatively insoluble starches can be reacted with a suitable reactive dye to yield a soluble product, the preferred embodiment of this invention utilizes amylopectin, the soluble starch fraction, as the starting material. The preferred amylopectin is sold commercially by National Starch and Chemical Corporation as Amioca 51–6002. Again, since this material is soluble it is possible to use a variety of the suitable reactive dyes and be assured that a water-soluble dyed substrate product will be obtained. However, in the preferred embodiment of this invention, the dye sold commercially by Geigy under the trade name Reactone Red 2B is used. This dye is reported in the literature (Ackermann and Dussy in Melliand's Textilber, vol. 42, page 1167, 1961) to have the following structure:

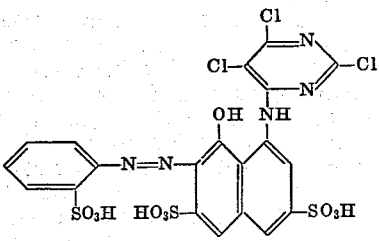

The water-soluble dyed substrate is obtained in accordance with the practice of this invention by coupling the starch starting material in an alkaline solution with a suitable reactive dye, and removing all unreacted dye from the product obtained. The temperature and duration of the reaction, as well as the ratio of starch to dye and alkaline concentration are all dependent variables which may be changed to a considerable extent and still yield the desired soluble substrate of this invention. However, for ease of operation, it has been found that conducting the reaction at room temperature (from about 20° C. to about 30° C.) overnight (from about 16 hours to about 24 hours) using a starch to dye ratio of from about 2.5:1 to about 100:1, preferably about 4:1, and alkaline concentrations of from about 0.1 to about 1.5 N, is practical and therefore preferred. The alkali in the resulting mixture is then neutralized with an aqueous solution of an acid, for example, aqueous hydrochloric acid.

It is essential that all unreacted dye be removed from the above reaction mixture in order that the resultant dyed substrate be suitable for use in the rapid and accurate determination of amylase activity: the presence of any free dye in the substrate would seriously interfere with test results since the measure of amylase activity in this assay is by means of optical density. Additionally, the improvements inherent in this amylase assay can only be achieved through the use of a water-soluble dyed substrate.

The fact that the dyed substrate obtained through the process of this invention is soluble in water does present many heretofor unsolved difficulties in removing all unreacted dye from and purifying the desired product. Prior art procedures as described in Fernly, Biochem. J., vol. 87, pp. 90–95 (1963), for purifying insoluble dyed substrates cannot be used to purify the water-soluble product of this invention. With other procedures, such as gel filtration, suitable for purifying a water-soluble product, it is not possible to determine whether all unreacted dye is completely removed during purification unless a selective precipitating agent for the dyed substrate is used. Precipitation with mineral acids and washing with water does not separate or purify the dyed substrate of this invention due to the fact that the product of the invention is soluble not only in water, but also in mineral acids. Further, conventional procedures used in the textile field for the removal of unreacted dye, such as described in U.S. Pat. No. 3,304,297 (Wegmann et al.), involve the use of alcohol. However, it has been found that these procedures have an adverse effect on the water solubility of the dyed substrate of this invention and since water solubility is critical, this procedure is also not acceptable.

It has now been found, quite surprisingly, that all unreacted dye can be completely removed from the dyed substrate of this invention by gel filtration or by dialysis, provided the purification procedure is monitored to detect the presence of free dye in successive fractions of a purified solution of the dyed substrate by precipitating out the water-soluble dyed substrate with an alcoholic tannic acid precipitating agent and observing the remaining supernatant fluid for the presence of dye color. Color of course, indicates that purification is incomplete. Suitable precipitating agents may be prepared from an alcoholic tannic acid solution brought to a temperature of from 20° C. to 30° C., containing from 0.5% to 2% tannic acid in 50% alcohol and buffered to a pH of from 5.0 to 5.5. The preferred precipitating agent is an alcoholic tannic acid solution of 50% methanol, containing 1% tannic acid, buffered to a pH of 5.3 to 5.4 and brought to a temperature of 23° C. to 26° C. It is particularly advantageous to utilize a precipitating agent buffered to a pH of 5.35 with a 0.1 N benzoic acid/sodium benzoate buffer, and brought to a temperature of about 25° C.

For purification by dialysis, a variety of procedures may be used but tubular dialysis casings having a diameter of from ½ to 1 and ½ inches, preferably 1 inch, have been found to be quite effective. The dialysis membrane itself may be one of many commercially available materials, provided the pore size is not larger than 24 angstroms. Suitably, dialysis casings of the cellophane type may be used. For the purification procedure, the dyed substrate reaction mixture is transferred into a 1 inch dialysis casing of suitable pore size and dialyzed against cold running tap water. The dialysis is preferably conducted at 4° C. to prevent bacterial growth. The free dye, being of smaller molecular size than the dyed substrate, passes through the pores of the dialysis membrane into the running water and the dyed substrate molecules remain behind. During dialysis, fractions of the dyed substrate solution are removed from the dialysis casing for testing: the alcoholic tannic acid precipitating agent is added to the fraction and the dyed substrate precipitates out; if the supernatant fluid shows color, dialysis must be continued to remove the unreacted dye present. Complete removal of all unreacted dye generally takes about one week.

For the purification by gel filtration, many substances may be used, but it has been found quite advantageous for the complete removal of all free dye to pack the chromatographic column with a material sold commercially as Sephadex G–25 by Pharmacia Fine Chemicals, Inc., Piscataway, N.J. this material is described as a bead polymerized, modified dextran obtained by fermentation of sugar. Within the chromatographic column, this material acts as a sieve: the smaller size of the free dye molecules permits their absorption into the gel pores of the packing material while the larger sized, dyed substrate molecules pass through the packing. Using water as the equilibrating fluid, the larger molecules are moved through the column much faster and become separated from the smaller molecules. Eventually, as the water is washed through the column, the smaller molecules are also washed down and one must monitor aliquots of the eluant for the presence of free dye. This is done as described above for the dialysis purification procedure, by adding an alcoholic tannic acid precipitating agent to a sample taken from successive aliquots of the eluant, precipitating out the dyed substrate, and observing the supernatant fluid for color: if color is shown, this indicates that free dye, which is soluble in the precipitating agent, is coming through, and the column is exhausted. All eluant from which the test sample was taken must be discarded or run through a fresh column and retested.

The solution of the soluble dyed substrate obtained by either of the above procedures must be buffered to a pH of from about 6.5 to about 7.8 with a conventional buffering agent for use in the amylase assay. In the preferred embodiment, a system which buffers at a pH of about 7 and does not interfere with the enzymatic reaction is particularly recommended. In this regard, it has been found that 0.1 M anhydrous dibasic potassium phosphate and 0.1 M monobasic potassium phosphate are most preferred as the buffering system.

Since chloride ions must be present to activate the enzyme amylase, small quantities of an agent which will yield chloride ions are also needed for the amylase assay. For example, a sufficient quantity of a dilute aqueous solution of sodium chloride to provide a concentration of from about 0.005 molar to about 0.05 molar in the final assay media has been found to be effective.

The assay media as described above can be stored as such, preferably at refrigeration temperatures, or lyophilized (freeze-dried) for preservation, and reconstituted with water at the time the assay is conducted. Alternately, the dyed starch product may be lyophilized as it is prepared, and the buffering agent and chloride ion material may be added just prior to use in an assay. However, for ease of use, accuracy of preparation and product stability, lyophilization after all necessary reagents have been added is preferred.

In carrying out the assay for amylase activity, from about 0.5 to about 2 ml. of a water solution containing about 1% of the dyed soluble substrate, buffered to a pH of from about 6.5 to about 7.8 and containing sufficient chloride ion for activation of the amylase, is incubated with a small amount (from about 0.1 to about 0.2 ml.) of fluid sample whose activity is to be determined. The incubation is conducted at conventional temperatures and for a specified period of time, which may vary to a considerable extent: the higher the temperature, the shorter the incubation time. It has been found that incubation for about 10 minutes at temperatures of about 37° C. provides an assay of extremely good sensitivity in the shortest length of time for the levels of amylase activity normally found in blood serum. One could conduct the incubation at a lower temperature for a longer period of time or for a shorter period of time if great sensitivity was not required. However, once the time and temperature for incubation is selected, it must be repeated with exactitude in all succeedings assays for which the same reference standards are to be used. At the end of the incubation period, all undigested dyed substrate and any protein matter present in the fluid samply being assayed must be removed in order to obtain accurate optical density measurements as an indication of amylase activity. The same precipitating agent, previously described as effective for monitoring the purification of the dyed substrate material, is used to remove all undigested dyed substrate during the assay procedure: a lower alcohol solution, (preferably methanol or ethanol) of tannic acid is preferably used as the precipitating agent. The precipitating agent should be added to the assay media at a controlled temperature and pH in order to achieve successful separation of any undigested starch and protein from the enzyme hydrolysis products on which optical density measurements are to be made. All of the above aspects of the precipitating agent are interrelated and many possible variations will achieve the desired results. For instance, the concentration of alcohol will affect the operable pH range; the concentration of tannic acid in the alcohol solution will affect the amount of buffer required; the temperature and the pH will affect the complete precipitation of undigested starch and protein material. It has been found, however, that the objectives of this invention are achieved by using, as the precipitating agent, from about 0.5% to about 2% solution of tannic acid in about 50% alcohol. The alcoholic tannic acid solution is buffered to a pH of from about 5.0 to about 5.5, preferably from about 5.3 to about 5.4. The precipitating agent is brought to a temperature of from about 20° C. to about 30° C., preferably from about 23° C. to about 26° C. before addition to the assay media. In the most preferred embodiment, the precipitating agent used is about 1% tannic acid solution in about 50% methanol, buffered to a pH of about 5.35, and brought to a temperature of about 25° C. The buffering agents which are suitable for use with the above precipitating agent include citrate, benzoate, acetate, and the like, of which the 0.1 M benzoate is preferred.

The precipitate formed by the addition of the precipitating agent is completely removed by centrifugation or by filtration. The separated residue is discarded and the clear supernatant fluid remaining contains the alcohol soluble, hydrolytic fragments resulting from the action of the amylase on the dyed starch substrate. The optical density of this supernatant fluid is then determined at the absorption maximum for the particular dye used. The optical density (absorbence) is a linear function of the concentration of amylase in the fluid samples being tested and when suitably calibrated, the amylase concentration may be read directly. A blank assay is run in which the precipitating agent is added before the enzyme sample. The optical density of the blank is subtracted from the optical density of the test sample to eliminate the effect of assay reagents on the values obtained for the enzymatic hydrolysis products.

The exact chemical structure of the soluble dyed substrate of this invention is not known, but it is believed that similar to the manner in which the reactive dyes couple with alkali treated cellulose, the dyes also combine with the free hydroxyl groups of the starch, amylose, or amylopectin employed. See for example U.S. Patent Nos. 1,886,480; 3,044,843; and 3,029,123. An empirical formula of $(C_6H_{10}O_5)n$—D has been assigned to these novel substrates, wherein $n$ is a large whole number, $(C_6H_{10}O_5)n$ represents a naturally occuring polymer such as starch, amylose, or amylopectin, and D is the residue of any reactive dye In order to illustrate the present invention the following examples are given.

EXAMPLE 1

Preparation of dyed amylopectin-gel filtration purification method 40 grams of acylopectin (Amioca Starch 51–6002) are dissolved in 1000 ml. of distilled water and stirred. 100 ml. of a 10% aqueous solution of Geigy Reactone Red 2B are added, followed by 100 ml. of 2.5 N NaOH solution, and batch is stirred until it becomes too viscous for stirring. The batch is covered and allowed to stand at room temperature (23° to 26° C.) for about 18 to 24 hours (overnight). Add 1 N hydrochloric acid (about 250 ml.), with stirring to neutralize the reaction mixture, (pH of 7) then dilute with distilled water to a volume of 1900 ml. and mix well. This reaction mixture is passed through a Sephadex G–25 column having a minimum height of 15 cm. and a void volume of 1100 ml., to remove all unreacted dye. Water is used as the equilibrating liquid. After about 1000 ml. of substrate solution reaction mixture has filtered through the column, 100 ml. aliquots of eluant are collected and monitored for the presence of the alcohol soluble dye by precipitating out the dyed substrate. First, the precipitating agent is prepared from a 1% tannic acid solution, in 50% methanol, buffered with 0.1 M benzoic acid/sodium benzoate buffer to a pH of 5.35 and brought to a temperature of 25° C. Next, the concentration of dyed substrate in each sample being tested diluted to 1% by adjusting to an optical density of 14. This is done by taking a 1 ml. sample from each aliquot of eluant, diluting to 100 ml. with distilled water, taking an optical density reading against water at 540 nanometers. An additional sample of the aliquot is diluted with water by a factor of optical density at 540 nm./0.14. 5 ml. of the precipitating agent is added to 1 ml. of this last dilution and the dyed substrate precipitates out. If the remaining supernatant fluid shows color, the aliquot of eluant from which the test sample was taken is impure and must be run through a fresh Sephadex column again and retested for the presence of dye. Only aliquots of eluant, which when tested as above show no dye color, are utilized. About 1400 ml. of purified dyed substrate solution is obtained in this manner.

The solution thus obtained is then buffered to maintain a pH of about 7 by the addition of an 0.1 M phosphate buffer. A sufficient amount of NaCl is added to yield 0.005 M NaCl in the final solution. The final solution may be used in the assay as described in Example 3 below or it may be lyophilized.

EXAMPLE 2

Preparation of dyed amylopectin-dialysis purification method

The procedure of Example 1 is followed to obtain the reaction mixture containing the dyed substrate, diluted to a volume of 1900 ml. The reaction mixture is then transferred to tubular, cellophane dialysis casings, 1 inch in diameter, with a pore size of 24 angstroms. The dyed substrate reaction mixture is dialyzed at 4° C. against cold runing tap water. Periodically, the casings are opened and a sample of the dyed substrate solution within is removed and tested for the presence of free dye. The testing procedure is exactly as described in Example 1 above, and if the supernatant fluid remaining shows dye color, the dialysis must be continued. In approximately one week, all unreacted dye is separated from the dyed substrate solution. The solution of dyed substrate obtained is further treated as in Example 1.

EXAMPLE 3

0.2 ml. of a sample of blood serum is incubated with 1 ml. of the buffered soluble dyed substrate obtained in accordance with Example 1 or Example 2 for 10 minutes at 37° C. At the end of this incubation period, 5 ml. of a 1% tannic acid solution, in 50% methanol, buffered with 0.1 M benzoic and sodium benzoate buffer to a pH of 5.35, is brought to a temperature of 25° C. and added to the assay media. The resulting precipitate is removed by centrifugation. The optical density of the supernatant solution is then determined at a wave length of 540 nm. A blank assay is run by adding the buffered alcoholic tannic acid precipitating agent before the enzyme source. The optical density of this blank is subtracted from the optical density of the unknown. As a reference standard, serum containing a known concentration of amylase is also subjected to the test. Since the amount of alcohol soluble, dyed hydrolytic fractions formed by the enzymatic hydrolysis of the substrate by the amylase present is proportional to the enzyme concentration, the amount of amylase present in the unknown sample can be readily calculated.

EXAMPLE 4

A soluble substrate is prepared from amylose and a reactive dye, in an analogous fashion to the procedure of Example 1 or 2. This product is used in the assay procedure of Example 3, and the results obtained are equally satisfactory.

EXAMPLE 5

A souble substrate of dyed corn starch and a reactive dye is prepared according to the procedure of Example 1 or 2 and employed in the assay procedure of Example 3. The results obtained are equally satisfactory.

It is understood that the foregoing detailed description is given merely by way of illustration and that many variations may be made therein without departing from the spirit of my invention.

Having described my invention, what I desire to secure by Letters Patent is:

1. A method for preparing a water-soluble dyed substrate free of unreacted dye having the formula:

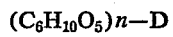

wherein $n$ is a large whole number, $(C_6H_{10}O_5)n$ is a polysaccharide selected from the group consisting of starch, amylose and amylopectin, and D is the residue of a reactive dyestuff, which comprises incubating an alkaline solution of the polysaccharide with the reactive dye; neutralizing the reaction mixture and removing all unreacted dye by a dialysis purification process monitored to detect the presence of free dye in a purified solution of the dyed substrate obtained from the dialysis separation, said monitoring being achieved by precipitating the water soluble dyed substrate with an alcoholic tannic acid precipitating agent and observing the remaining supernatant fluid for the presence of color.

2. A method according to claim 1 wherein the polysaccharide is amylopectin, and the reactive dye has the formula:

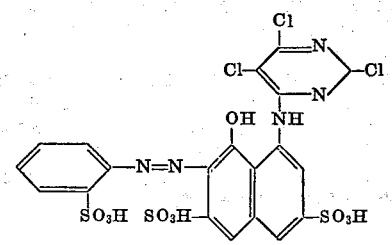

3. A method according to claim 2 wherein the precipitating agent is a solution of about 50% methanol containing about 1% tannic acid, buffered to a pH of about 5.35 with a 0.1 M benzoic acid/sodium benzoate buffer and brought to a temperature of about 25° C.

4. A method according to claim 1 wherein the unreacted dye is removed by a dialysis process wherein tubular dialysis casings are used having a pore size measuring 24 angstroms or smaller; and wherein the dialysis is conducted against cold, running water.

5. A method according to claim 4 wherein the precipitating agent is an alcoholic tannic acid solution which has been brought to a temperature of from about 20° C. to about 30° C., containing from about 0.5% to about 2% tannic acid in about 50% alcohol, buffered to a pH of from about 5.0 to about 5.5.

6. A method according to claim 4 wherein the precipitating agent is an alcoholic tannic acid solution of about 50% methanol containing about 1% tannic acid, buffered to a pH of from about 5.3 to about 5.4, and brought to a temperature of from about 23° C. to about 26° C.

7. A method according to claim 4 wherein the precipitating agent is a solution of about 50% methanol containing about 1% tannic acid, buffered to a pH of about 5.35 with a 0.1 M benzoic acid/sodium benzoate buffer and brought to a temperature of about 25° C.

8. A method for preparing a water-soluble dyed substrate free of unreacted dye having the formula:

wherein $n$ is a large whole number $(C_6H_{10}O_5)n$ is a polysaccharide selected from the group consisting of starch, amylose and amylopectin, and D is the residue of a reactive dyestuff, which comprises incubating an alkaline solution of the polysaccharide with the reactive dye; neutralizing the reaction mixture and removing all unreacted dye by a gel filtration process monitored to detect the presence of free dye in an eluant solution of the purified dyed substrate obtained from the gel filtration separation, said monitoring being achieved by precipitating the water soluble dyed substrate with an alcoholic tannic acid precipitating agent observing the remaining supernatant fluid for the presence of color.

9. A method according to claim 8 wherein the polysaccharide is amylopectin, and the reactive dye has the formula:

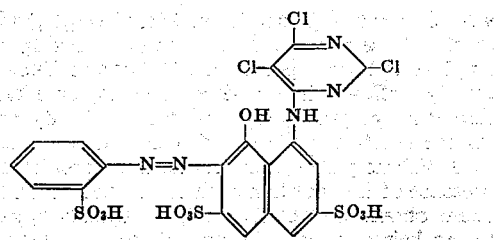

10. A method according to claim 9 wherein the precipitating agent is a solution of about 50% methanol containing about 1% tannic acid, buffered to a pH of about 5.35 with a 0.1 M benzoic acid/sodium benzoate buffer and brought to a temperature of about 25° C.

11. A method according to claim 8 wherein the unreacted dye is removed by a gel filtration process wherein the separation medium is a polymerized, modified dextran obtained by the fermentation of sugar, and wherein the equilibrating fluid is water.

12. A method according to claim 11 wherein the precipitating agent is an alcoholic tannic acid solution which has been brought to a temperature of from about 20° C. to about 30° C., containing from about 0.5% to about 2% tannic acid in about 50% alcohol, buffered to a pH of from about 5.0 to about 5.5.

13. A method according to claim 11 wherein the precipitating agent is an alcoholic tannic acid solution of about 50% methanol containing about 1% tannic acid, buffered to a pH of from about 5.3 to about 5.4, and brought to a temperature of from about 23° C. to about 26° C.

14. A method according to claim 11 wherein the precipitating agent is a solution of about 50% methanol containing about 1% tannic acid, buffered to a pH of about 5.35 with a 0.1 M benzoic acid/sodium benzoate buffer and brought to a temperature of about 25° C.

References Cited

UNITED STATES PATENTS 3,304,297   2/1967   Wegmann et al. _____ 260—144

OTHER REFERENCES

Fernley, Biochem. Journal, vol. 87, pp. 90–95 (1963).

Huggins et al., Annals of Surgery, vol. 128, pp. 668–678 (1948).

DONALD E. CZAJA, Primary Examiner

R. W. GRIFFIN, Assistant Examiner

U.S. Cl. X.R.

195—103.5; 260—144